Figures 1, 2, 3:
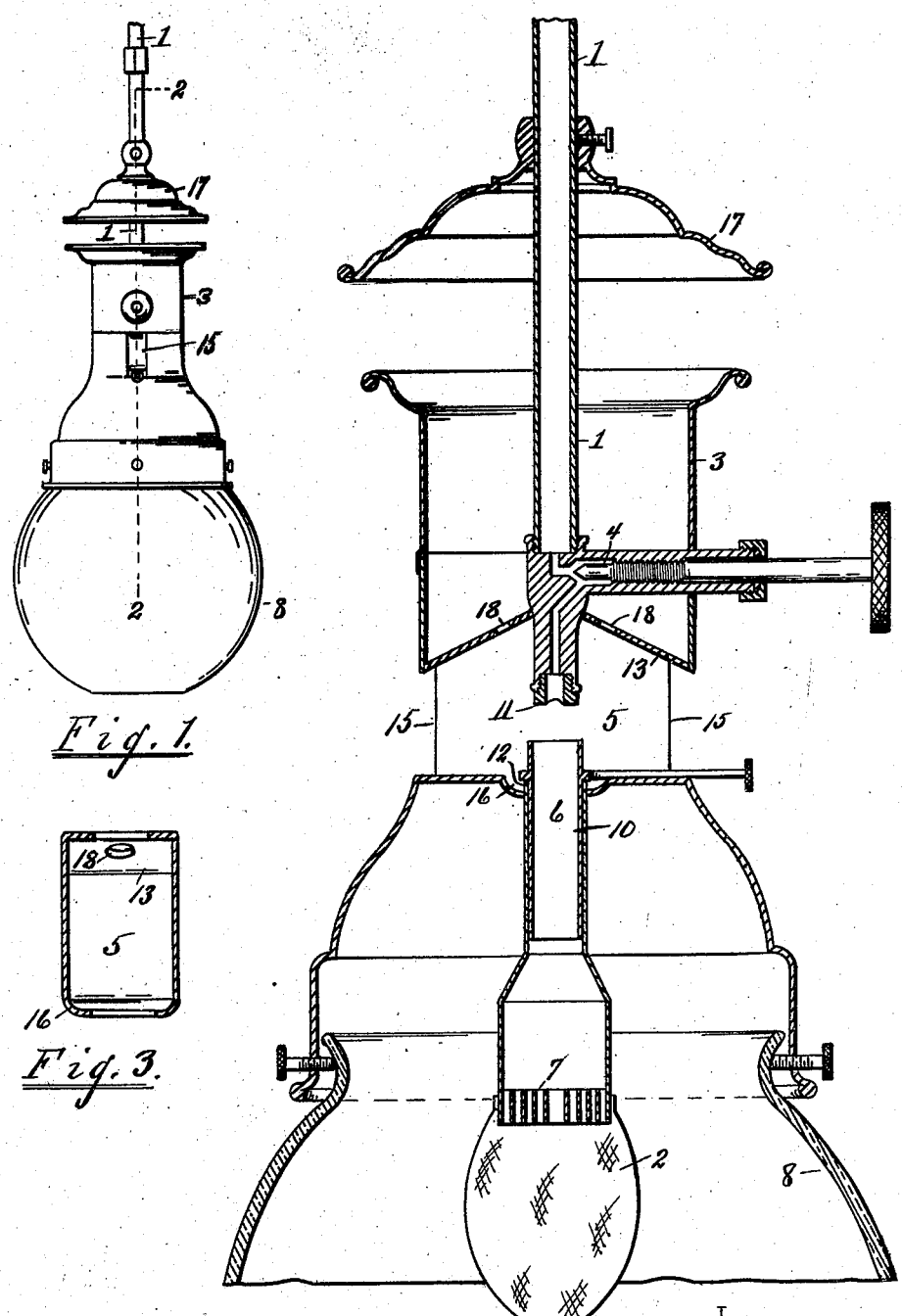

No. 885,699. PATENTED APR. 21, 1908.
E. H. PALMER & W. A. WILLITS.
LAMP.
APPLICATION FILED SEPT. 17, 1906.

WITNESSES
Lotta Lee Hayton
O. B. Buenziger

INVENTORS
Edward H. Palmer
William A. Willits
By Parker & Burton Attys

UNITED STATES PATENT OFFICE.

EDWARD H. PALMER AND WILLIAM A. WILLITS, OF DETROIT, MICHIGAN; SAID WILLITS ASSIGNOR TO SAID PALMER.

LAMP.

No. 885,699.                Specification of Letters Patent.            Patented April 21, 1908.

Application filed September 17, 1906.  Serial No. 334,861.

*To all whom it may concern:*

Be it known that we, EDWARD H. PALMER and WILLIAM A. WILLITS, both of whom are citizens of the United States, residing at Detroit, county of Wayne, State of Michigan, have invented a certain new and useful Improvement in Lamps, and declare the following to be a full, clear, and exact description of the same, such as will enable others skilled in the art to which it pertains to make and use the same, reference being had to the accompanying drawings, which from a part of this specification.

This invention relates to lamps; it has for its object an improved construction of that class of lamps in which the fuel is converted from a liquid to a vaporous form in the lamp itself and the vapor is fed downward from its place of production to an underhanging mantle.

The objects of the invention are carried out in a structure which comprises a feed pipe provided with a suitable controlling valve. Hanging below the feed pipe, in axial alinement with it, is a mixer, the upper end of which is spaced from the lower end of the feed pipe; the lower end of the feed pipe and the upper end of the mixer project into an air chamber that is itself located within a chimney, which chimney surrounds the lower end of the feed pipe and the mixer, and terminates at its lower end with a suitable support for a globe. The air chamber in which the feed pipe projects has free openings into it through the walls of the chimney, and there are free passages at each side of it between its own walls and the walls of the chimney for the upward passage of the heated products of combustion.

In the drawings:—Figure 1, shows the general construction of the complete lamp. Fig. 2, is an enlarged sectional elevation of the generating part of the lamp. Fig. 3, is a sectional elevation of the air chamber.

1, indicates a hanging pipe through which the fuel is fed to the hanging mantle 2. The end of the pipe 1 is surrounded by a chimney 3 which muffles or confines the heat rising from the flame at the mantle 2, holding it closely confined to the pipe, especially that part of the pipe which is located between the controlling valve 4 and the cap 17, which part of the pipe may be utilized for a generating chamber or retort. The fuel passes a controlling valve 4, emerges from the end of the feed pipe and travels through a chamber 5 into the mixing chamber 6, thence the fuel in the form of vapor mixed with air travels downward through a screen 7 and is burned within and without the mantle 2.

The mixing chamber 6 is tubular and is regulated by means of an internal tube 10 that can be adjusted vertically to vary the distance between the lower end 11 of the feed pipe and the upper end 12 of the sliding tube.

The end 11 of the feed pipe 1 hangs through the roof 13 of air chamber 5. The upper end 12 of the mixer 6 rises through the floor of the same air chamber 5. The air chamber itself is a narrow rectangular chamber extending across the chimney and provided with entrance ports 15 at each side, which open through the walls of the chimney into the outer air. At each side of the chamber 5 between its walls and the walls of the chimney is a free passage for the upward travel of products of combustion, and through the roof 13 of the chamber 5, are small openings 18, which permit the escape from the chamber into the chimney, of air heated within the chamber 5 by the introduction thereinto of a torch or by the combustion therein of a small portion of liquid fuel, which may be introduced into the cup-like depression 16 immediately surrounding the shell of the mixing chamber and constructed in the floor of the chamber 5.

The diaphragm which forms the roof 13 of the chamber 5, is located below the controlling valve 4, and a large part of the feed tube 1, is located within the chimney 3, where it is subject to the upward currents of heated air which arise either from the combustion at the mantle 2 or from the combustion of a torch inserted within the chamber 5.

By the construction described, the initial heating to start the lamp and produce the first vapor is easily effected by introducing a torch into the chamber 5 below the outlet end 11 of the feed tube 1, or by introducing a small amount of fuel into the cup 16 and igniting it.

At the time of initial lighting, the device employed to produce initial vaporization is confined in such close contact with that part of the hanging pipe 1, which hangs in the air chamber 5, that the initial heating is very rapid. After the liquid is burned out of the cup or the torch has been removed, the vapor generated in the retort of the tube 1 passes across the interval between the end 11 of the hanging pipe 1, and the mixer and receives a sufficient supply of air which enters through the ports 15 and is carried down into and through the mixer with the vapor.

What we claim is:—

1. In combination with a depending feed pipe and a regulating valve therefor, a mixing chamber below said feed pipe and spaced therefrom, a chimney surrounding the mixing chamber and the lower part of the feed pipe, an air chamber located within the chimney closed at its bottom and sides and provided with openings thereinto through the walls of said chimney adapted to admit of the production of a starting flame therein, and with a perforated diaphragm forming the upper side of said chamber, and located below the upper end of said chimney whereby a portion of the feed pipe hanging in said chimney is in position to be exposed to hot air currents arising from either the combustion at the mantle or from a combustion within said air chamber, substantially as described.

2. In combination with a chimney for a hanging vapor producing and burning lamp, a mixing chamber and a fresh air supply chamber located within said chimney, a feed pipe hanging into said chimney and having a portion thereof within said chimney and above said fresh air chamber exposed to heated air rising from below said fresh air chamber, said fresh air chamber being provided with discharge openings through the upper wall thereof into the said chimney, substantially as described.

In testimony whereof, we sign this specification in the presence of two witnesses.

EDWARD H. PALMER.
WILLIAM A. WILLITS.

Witnesses:
WILLIAM M. SWAN,
CHARLES F. BURTON.